US012780052B2

(12) United States Patent
Fujii et al.

(10) Patent No.: US 12,780,052 B2
(45) Date of Patent: Nov. 3, 2026

(54) SLIDER FOR CAR SEAT SUPPORT

(71) Applicants: Ems-Chemie AG, Domat/Ems (CH); TOYOTA Boshoku Seiko Co.,Ltd., Takahama (JP)

(72) Inventors: Takamasa Fujii, Tokyo (JP); Gabriele Castaldi, Shenzhen city (CN); Jian Yang, Suzhou (CN); Philipp Harder, Chur (CH); Masashi Komiyama, Takahama (JP); Keisuke Yoshida, Takahama (JP); Yoichi Fujii, Takahama (JP)

(73) Assignees: EMS-CHEMIE AG, Domat/Ems (CH); TOYOTA BOSHOKU KABUSHIKI KAISHA, Kariya (JP)

( * ) Notice: Subject to any disclaimer, the term of this patent is extended or adjusted under 35 U.S.C. 154(b) by 0 days.

(21) Appl. No.: 18/851,879

(22) PCT Filed: Mar. 31, 2022

(86) PCT No.: PCT/EP2022/058650
§ 371 (c)(1),
(2) Date: Sep. 27, 2024

(87) PCT Pub. No.: WO2023/186315
PCT Pub. Date: Oct. 5, 2023

(65) Prior Publication Data

US 2025/0368095 A1 Dec. 4, 2025

(51) Int. Cl.
*B60N 2/07* (2006.01)
*B29C 45/00* (2006.01)
(Continued)

(52) U.S. Cl.
CPC ........ *B60N 2/0732* (2013.01); *B29C 45/0005* (2013.01); *F16C 29/02* (2013.01);
(Continued)

(58) Field of Classification Search
CPC ... B60N 2/0732; B29C 45/0005; F16C 29/02; B29K 2077/00; B29K 2077/10; B29K 2309/08; B29K 2995/0017; B29L 2031/30
See application file for complete search history.

(56) References Cited

U.S. PATENT DOCUMENTS 4,274,293 A 6/1981 Ruger
6,260,813 B1 * 7/2001 Whitcomb ......... B64D 11/0696 244/118.6
(Continued)

FOREIGN PATENT DOCUMENTS

DE 3522773 A1 3/1986
DE 4214684 A1 * 11/1993 ............. B60N 2/072
(Continued)

OTHER PUBLICATIONS

International Search Report for PCT/EP2022/058650 dated Dec. 8, 2022 (PCT/ISA/210).
(Continued)

*Primary Examiner* — Terrell L Mckinnon
*Assistant Examiner* — Ding Y Tan
(74) *Attorney, Agent, or Firm* — Sughrue Mion, PLLC

(57) ABSTRACT

Slider (1) for a car seat support which can be locked in different positions along a sliding direction (25), to be mounted in a metal rail (2), wherein the slider (1) has an extended base portion (3) and an extended upper portion (4). The base portion (3) and the upper portion (4) are connected by a constricted portion (13). The base portion (3) has two lateral guide portions (5,5') with guide protrusions (6,6') pointing upward in the direction of the upper portion (4) and forming, with the constricted portion (13), a groove (12) on each side. The slider may (1) essentially consist of fibre reinforced polyamide.

27 Claims, 2 Drawing Sheets

(51) Int. Cl.

| | |
|---|---|
| ***B29K 77/00*** | (2006.01) |
| ***B29K 309/08*** | (2006.01) |
| ***B29L 31/30*** | (2006.01) |
| ***F16C 29/02*** | (2006.01) |

(52) U.S. Cl.

CPC ...... *B29K 2077/00* (2013.01); *B29K 2077/10* (2013.01); *B29K 2309/08* (2013.01); *B29K 2995/0017* (2013.01); *B29L 2031/30* (2013.01)

(56) References Cited

U.S. PATENT DOCUMENTS

| | | | | |
|---|---|---|---|---|
| 2002/0130238 | A1* | 9/2002 | Downey | B60N 2/0705 296/65.05 |
| 2007/0090260 | A1* | 4/2007 | Kojima | B60N 2/0843 248/424 |
| 2007/0170743 | A1 | 7/2007 | Kinoshita et al. | |
| 2010/0067999 | A1* | 3/2010 | Poupon | B60N 2/07 410/105 |
| 2014/0150969 | A1* | 6/2014 | Bardenhagen | B29C 70/443 156/382 |
| 2020/0086767 | A1* | 3/2020 | Ogasawara | B60N 2/0715 |
| 2020/0406786 | A1* | 12/2020 | Nishio | B60N 2/0715 |

FOREIGN PATENT DOCUMENTS

| | | | | |
|---|---|---|---|---|
| EP | 0439416 | A1 * | 7/1991 | B60N 2/072 |
| EP | 1731352 | A2 * | 12/2006 | B60N 2/075 |
| JP | 55-144130 | U | 10/1980 | |
| JP | 2003039994 | A * | 2/2003 | |
| JP | 2007-186104 | A | 7/2007 | |
| JP | 2018203075 | A * | 12/2018 | |
| WO | 2018/043344 | A1 | 3/2018 | |

OTHER PUBLICATIONS

Written Opinion for PCT/EP2022/058650 dated Dec. 8, 2022 (PCT/ISA/237).

Communication issued Jan. 26, 2026 in Japanese Patent Application No. 2024-556560.

Communication dated Dec. 2, 2025, issued in European Application No. 22 720 587.9.

* cited by examiner

SLIDER FOR CAR SEAT SUPPORT

CROSS REFERENCE TO RELATED APPLICATIONS

This application is a National Stage of International Application No. PCT/EP2022/058650 filed Mar. 31, 2022.

TECHNICAL FIELD

The present invention relates to a slider, also often termed as upper rail, for a car seat support as well as to a method for making such an upper rail and uses of such an upper rail.

PRIOR ART

Car seats are mounted in the chassis in a slidable manner, such that the position can be adapted to the size of the driver. To this end there are provided metal rails which are fixedly attached to the floor of the passenger area (lower rails), essentially arranged along a driving direction, and upper, sliding rails or sliders that are attached to the car seat, suitable and adapted to slide in these lower metal rails. There are provided actuators for manual unlocking and locking of the sliders so that the car seat can be fixed in the desired position, typically the corresponding locking takes place by form closure.

DE-A-3522773 discloses a vehicle seat which has two base rails which are attached to a floor section of a vehicle, two upper rails being attached to a seat assembly and being connected to a seat chord attached thereto. Each base rail and each upper rail has first and second flanges extending from the latter. The first flange of the base rail is provided in each case with a bearing made of plastic or nylon. The first flange of the upper rail forms a U-profile for receiving the first flange of the base rail and for receiving the bearing. The second flanges of the base rail and that of the upper rail have cross-sections which complement one another. If the upper rail is subjected to a specific force via the seat chord, the second flanges of the base rail and the flanges of the upper rail come to rest against one another so that the upper rail is held interconnected with the lower rail.

U.S. Pat. No. 4,274,293 discloses a mechanism which uses a drive block having mounting lugs on both transverse sides of the block for mounting in slots on opposed sides of a C-shaped bracket. The slots in the bracket are T-shaped, the body of the T accepting the mounting lugs for passage to the circular T head opening. By rotating the block 90 DEG, the lugs rest in the circular opening and are held in place. Each lug has a necked down section passing through the slotted opening of the brackets. Each lug has an enlarged head extending outwardly of the bracket sides to prevent the bracket sides from spreading in response to shock forces acting on the seat track. The block has a central threaded opening to accept a lead screw for driving the seat track responsive to rotation of the lead screw. The bracket is secured to the seat track and the drive block is inserted into the bracket, rotated to position and mated with the lead screw.

EP-A-1731352 discloses, how a seat can be longitudinally moved by sliding an upper rail permanently joined to the lower surface of the seat along a lower rail fixed to the floor of the vehicle. Both rails are provided with lateral borders bent in order to engage with each other.

One of the joined areas is equipped with a sliding unit assembled of a number of spherical elements. A plastic support element designed in a wedge shape is positioned along one side at the bottom of the lower rail in order to prevent the seat from tilting to the back or to the side when pulled to the very front or rear.

US-A-2010067999 relates to a fastener assembly that has a rail and a fastener device that can be installed in a transport vehicle, characterized in that a rail head is coated with a layer of alumina with polytetrafluoroethylene seal and that at least a portion of the fastener device in contact with the rail head is made of metal coated with a layer of polymers.

SUMMARY OF THE INVENTION

It is an object of the present invention to provide an improved design of an upper rail, or slider for a car seat support. The terms “upper rail” and “slider” are to be understood as synonyms in the present context.

Specifically, the present invention relates to a slider according to claim 1.

What is proposed is a slider for a car seat support which can be locked in different positions along a sliding direction, to be mounted in a metal rail, also termed lower metal rail.

According to the invention, the slider comprises an extended base portion and an extended upper portion, said base portion and said upper portion being connected by a constricted portion.

Furthermore said base portion according to the invention preferably comprises two lateral guide portions with guide protrusions pointing upward in the direction of said upper portion and forming, with said constricted portion, a groove on each side.

Furthermore, according to the invention the slider essentially consists of fibre reinforced polyamide, preferably of endless fibre reinforced polyamide.

The proposed new design unexpectedly provides for the required stability even under heavy stress situations. In spite of the fact that the slider consists of a thermoplastic fibre reinforced or endless fibre reinforced polyamide material, it has sufficient strain at break properties and allows full functionality as with metal rails (lower rails), but provides for lower weight and easier handling as well as easier manufacturing and assembly. The slider provided by the invention has, in particular, low friction and reduced noise.

According to a first preferred embodiment, the base portion, in a middle region along the sliding direction, comprises at least one through-opening to be penetrated by at least one tooth of at least one locking lever.

Preferably above said middle region there is located a window, which forms a through opening in a transverse direction, and which allows penetration of a corresponding metal lever for fixing the slider in a particular desired position.

Further preferably, in that middle region there are no lateral guide portions.

Preferably, said through opening comprises a metal sleeve, preferably having a wall thickness in the range of 0.5-5 mm, preferably in the range of 1.0-3 mm, and wherein further preferably the metal of said sleeve is selected from the group consisting of iron, and alloys thereof, in particular steel, preferably stainless steel.

In particular the metal sleeves mounted in the interior of corresponding openings in the thermoplastic fibre reinforced polyamide material, allow to reach the required mechanical properties.

According to yet another preferred embodiment, said groove has a transverse width (a4) in the range of 2-10 mm, preferably in the range of 4-8 mm.

The slider according to the invention is preferably characterised in that said groove has an at least partially rounded bottom. In fact it was found that for high mechanical stability the shape of the grooves in case of using a thermoplastic fibre reinforced polyamide material can be important. The rounded shape can significantly contribute to that stability.

Preferably that rounded bottom is having a radius R in the range of 1-5 mm, preferably in the range of 1-3 mm.

Preferably the shape of the rounded bottom is rounded in the transition from said constriction with a large radius R and forms a sharp or essentially sharp edge or a rounded transition with a smaller radius with an inner face of the respective guide protrusion, wherein said smaller radius is preferably in the range of 0.1-1 mm, more preferably in the range of 0.2-0.7 mm.

Said upper portion further preferably comprises at least one cutout for a holding pin, preferably a metal holding pin, preferably made of iron ore and alloys thereof, in particular steel or stainless steel, wherein the holding pin points essentially along the sliding direction, and wherein below said holding pin there is a passage opening with a rounded lower surface to said lower portion. Again for the particular situation of having a thermoplastic fibre reinforced polyamide material for the slider this rounded bottom shape significantly contributes to the stability under mechanical load.

Said rounded lower surface in the bottom portion thereof essentially preferably forms a half-cylindrical surface with a horizontal axis essentially perpendicular to the sliding direction.

The diameter d1 of said rounded lower surface preferably is in the range of 10-40 mm, preferably in the range of 20-30 mm.

As concerns the dimensions, in particular for the situation of using glass fibre reinforced thermoplastic polyamide material for the slider, are preferably selected as follows:

- the transverse width a1 of the constricted portion is in the range of 10-20 mm, preferably in the range of 12-16 mm,
- and/or the transverse width a5 of the guide protrusion is in the range of 5-15 mm, preferably in the range of 7.5-12 mm,
- and/or the height a7 of the guide protrusion is in the range of 15-30 mm, preferably in the range of 20-30 mm,
- and/or the height a6 of said groove is in the range of 4-12 mm, preferably in the range of 7-11 mm, and/or a the total transverse width w of the bottom portion is in the range of 30-60 mm, preferably in the range of 40-50 mm.

Said constriction in a cross-sectional view of the shape preferably widens in an essentially conical portion to the width of the proportion and wherein preferably the upper surface, in a cross-sectional view, is rounded, preferably with a radius in the range of 10-30 mm, preferably in the range of 15-25 mm.

Further preferably the slider comprises or essentially consists of (glass) fibre reinforced blend (A) of an aliphatic polyamide (A1) and at least one partially aromatic thermoplastic polyamide (A2), or a mixture of aromatic thermoplastic polyamides (A2), wherein the aromatic thermoplastic polyamide can preferably be a partially aromatic thermoplastic amorphous polyamide.

Preferably, the polyamide mixture (A) consists of (A1) 65 to 85 parts by weight, of an aliphatic polyamide, preferably with a glass transition, temperature>70° C., measured according to ISO 11357-2:2020 on unconditioned material, preferably selected from the group consisting of PA6, PA66, PA66/6, PA610 and mixtures thereof;

(A2) 15 to 35 parts by weight of an amorphous polyamide built from:

(A2-1) 60 to 100 parts by weight, preferably 60 to 80 parts by weight, particularly preferably 60 to 65 parts by weight or 67 parts by weight, of polyamide units derived from isophthalic acid in combination with hexamethylenediamine (1,6-hexanediamine) in an essentially equimolar ratio, (A2-2) 0 to 40 parts by weight, preferably 20 to 40 parts by weight, more preferably 30 to 35 parts by weight or 33 parts by weight of polyamide units derived from terephthalic acid in combination with hexamethylenediamine in an essentially equimolar ratio, wherein the parts by weight of components (A2-1) and (A2-2) together give 100 parts by weight of the total polyamide 6I/6T (A2), and wherein the parts by weight of components (A1) and (A2) together give 100 parts by weight of the polyamide mixture (A).

As for the total of the material, preferably said polyamide mixture (A), in a proportion of 60-30% by weight, is supplemented with 40-70% by weight, preferably in the range of 45-65% by weight of fibres (B), preferably glass fibres, and if needed further additives (C) in a proportion of 0-5% by weight, preferably 0.1-2% by weight, wherein the total of the material of the slider is given by the sum of (A)-(C).

The additives can be selected from the group consisting of: polyamides different from (A); UV stabilizers; heat stabilizers; flame retardants, free-radical scavengers, processing aids; inclusion preventers; lubricants; demoulding aids, inclusive of metal stearates and metal montanates, where the metal is preferably selected from the group consisting of magnesium, calcium, barium, mineral oils and fatty acid amides; plasticizers; impact modifiers; fillers and/or aggregates; optical brighteners; dyes and mixtures thereof, where the fillers and/or aggregates are preferably nanoscale and/or selected from the following group: glass beads, carbon black, graphite, mineral inclusive of titanium dioxide, calcium carbonate and barium sulfate.

Preferably, the fibre reinforcement is an endless or long fibre reinforcement, the number average length of the fibres in the upper rail/slider being larger than 0.5 mm, preferably larger than 0.7 mm, more preferably in the range of 0.5-5 mm, more preferably in the range of 0.7-3 mm.

The fibre reinforcement is typically a carbon fibre or glass fibre reinforcement, preferably a glassfibre reinforcement selected from the group consisting of E-glass, ECR-glass, M-glass, S-glass, C-glass or a combination thereof.

Where the endless or long fibres are endless or long glass fibres, these preferably consist of fibres having a diameter in the range of 10-25 μm, preferably in the range of 11-18 μm. Where the endless or long fibres are carbon fibres, these preferably consist of fibres having a diameter in the range of 3-12 μm, preferably in the range of 4-10 μm.

Preferably the slider or the material of the slider has a heat deflection temperature HDT-A (1.8 MPa) of at least 200° C., preferably at least 240° C., preferably in the range of 240-260° C. and/or a heat deflection temperature HDT-C (8 MPa) of at least 190° C., preferably at least 200° C., preferably in the range of 210-230° C., in each case for a glass fibre reinforcement of ≥50% by weight.

Furthermore the present invention relates to a method for producing a slider according to any of the preceding claims, wherein it is produced in an injection moulding or injection-compression-moulding process starting out from long fibre reinforced pellets having a length of 3-25 mm, preferably in the range of 4-12 mm.

Also the present invention relates to a car comprising at least one such slider. Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
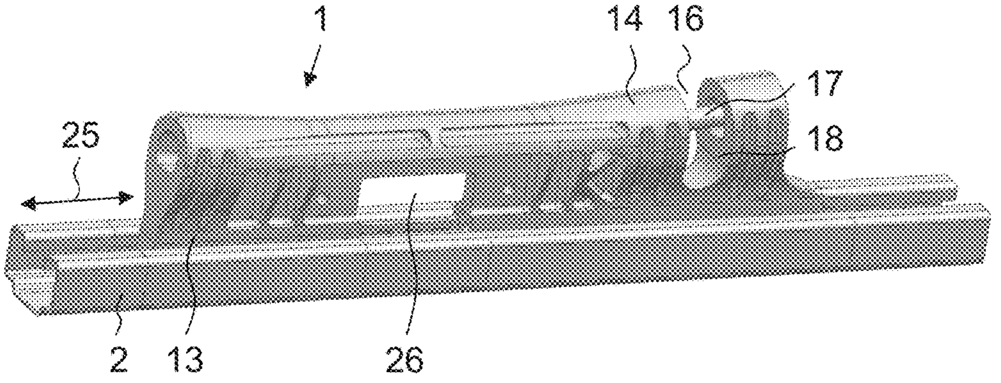
FIG. 1 shows a rail and a slider for a car seat in a perspective view.
Figure 2:
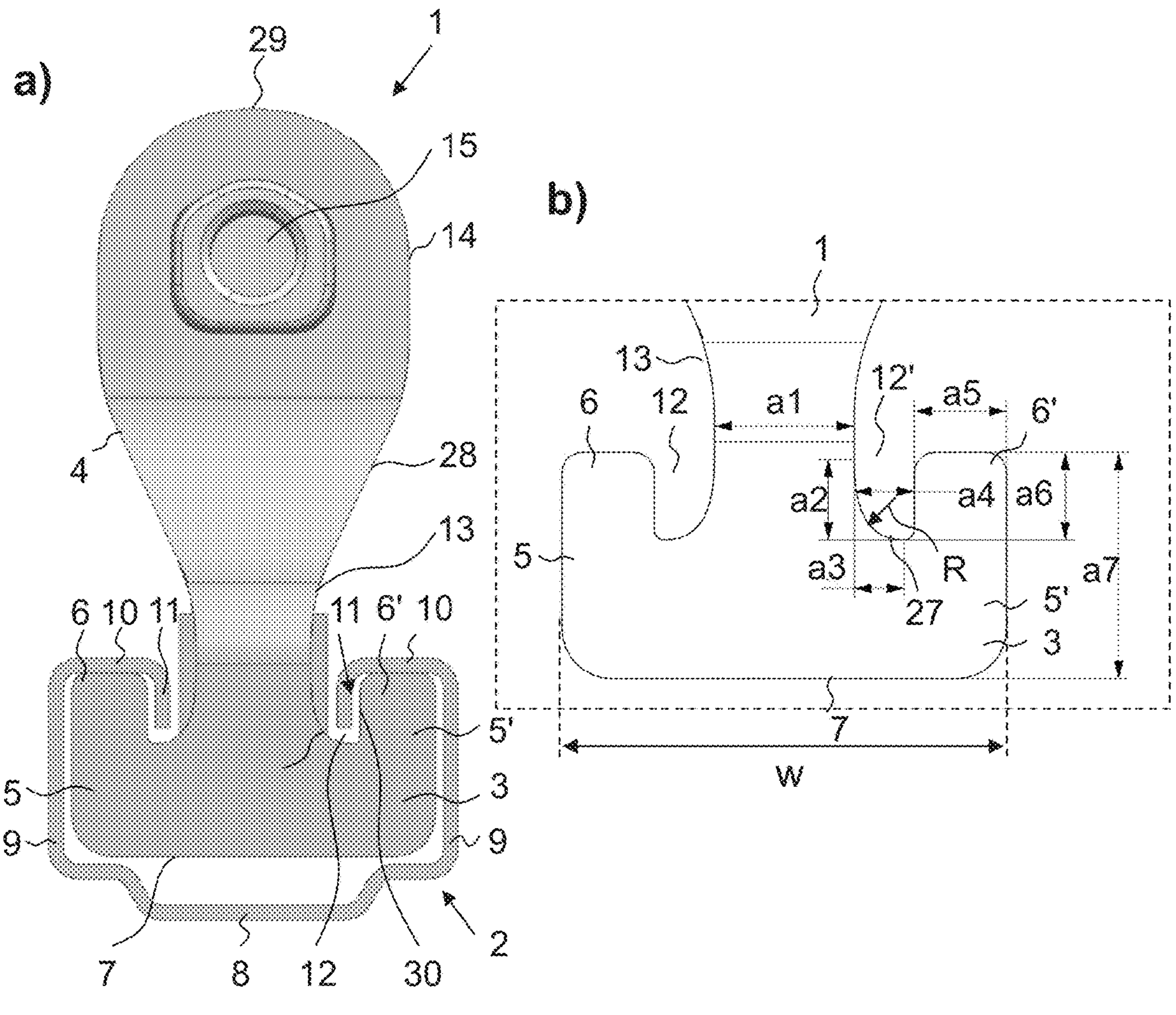
FIG. 2 *a*) to FIG. 2 *b*) show in FIG. 2 *a*) a cut through the slider according to FIG. 1 in a direction transverse to the sliding direction, and in FIG. 2 *b*) the bottom portion thereof with dimensions.

FIG. 1 shows a perspective view onto a slider 1 and a metal rail 2. In FIG. 2 *a*) a cut a long a direction perpendicular to the sliding direction 25 is given and in b) the details of the foot section of the slider alone with dimensions.

The slider 1 comprises a base portion 3 and an upper portion 4, each extending along the sliding direction 25. The slider 1 slides in a metal rail 2. The slider is made of thermoplastic amorphous polyamide material which is glassfibre reinforced.

The base portion 3 comprises two lateral guide portions 5, which in an upwards direction each comprise guide protrusions 6. Between these guide protrusions 6 slot 12 is formed, which on the outer side is bordered by the inner surface 29 of the respective protrusion 6 and by a constriction 13, which is located between the base portion 3 and the proportion 4. Above the constriction 13 the proportion widens in a conical portion 28 to reach the final width of the widened portion 14, and the top surface 29 is rounded. The widened portion essentially defines an upper axis 15, along which also the holding pin 17 is located.

At one and of the slider 1 there is located a cutout 16 from the top, in which the holding pin 17 is mounted, in a direction essentially parallel to the sliding direction. The holding pin is there to fix the actual seat construction on the slider. Below the holding pin 17 there is a passage opening 18.

In a middle portion of the slider 1 there is located a window 26, which provides a through opening between the widened portion 14 and the base portion 3, which themselves extend along essentially the full length of the slider. The function of that window 26 will be detailed further below.

As one can see from FIG. 2 *a*) the metal rail 2 typically has a bottom portion 8, which is followed by two lateral sidewalls 9, followed by inwardly pointing horizontal portions 10. At the inner end of that horizontal portion 10 in each case there is a downward facing portion 11. That downward facing portion 11 penetrates and engages with the above-mentioned slot 12 in the slider. Typically the metal rail is produced in a punching and forming process from flat metal starting material.

The bottom surface 7 of the base portion 3 slides on the upper surface of the bottom portion 8 of the metal rail. As mentioned above, the downward facing portions 11 of the metal rail engage with the slots 12 between the constriction 13 and the guide protrusion. The slot 12 has a particular shape to provide for maximum stability, namely it is provided with a rounded bottom 27 which is however asymmetric in the sense that it is smoothly rounded at the transition from the constriction 13 to the bottom, and then in an essentially sharp edge transitions to the inner surface 30 of the guide protrusion 6. In fact, that very shape provided significantly improved mechanical stability in particular in case of using long glass fibre reinforced polyamide as material for the slider.

Figure 3:
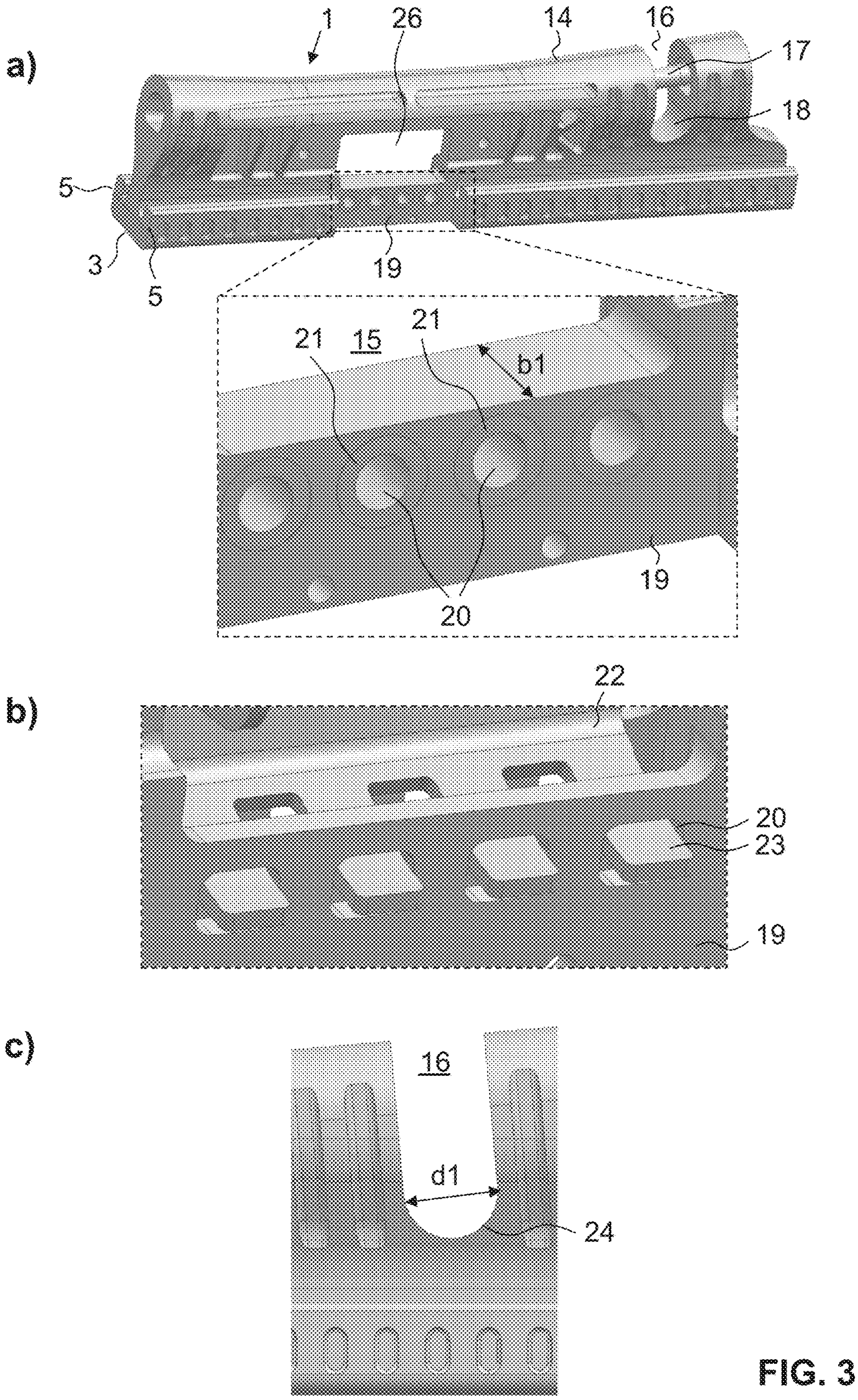
FIG. 3 *a*) to FIG. 3 *c*) show in FIG. 3 *a*) a slider together with a magnification of the middle region for the locking, in FIG. 3 *b*) the general principle of form closure locking and in FIG. 3 *c*) a lateral view on the cutout without metal pin.

The mechanism for locking the slider in a particular position or rather essential elements thereof are illustrated in FIGS. 3 *a*) and 3 *b*). In a middle portion of the slider there is provided the above-mentioned window 26. Below that window the base portion 3 does not comprise lateral guide portions, in other words the guide portions 5 are interrupted in the region of that window 26. In that middle region therefore the base portion 3 is narrower than in the terminal regions of the slider. That narrow portion, which is the locking section 19 of the slider, is provided with through openings 20 penetrating the locking section 19 in a transverse direction. In order to provide for sufficient stability under load in case of using long fibre reinforced polyamide material for the slider these openings 20 are provided with metal sleeves 21 which are mounted in these openings. This increases the mechanical stability for the situation as illustrated in FIG. 3 *b*), namely when the teeth 23 of the locking lever 22 which is arranged in the region of the window 26 penetrates through the openings 20 and engages with corresponding recesses in the metal rail.

Another important element for achieving sufficient stability in case of using long fibre reinforced polyamide material for the slider is illustrated in FIG. 3 *c*). It was found that for achieving the sufficient mechanical stability is beneficial if the passage opening 18 is provided with a rounded lower surface 24 which is essentially given by a half cylinder surface with an axis transverse to the sliding direction 25.

The material of the slider is given as in Table 1. The slider was produced using injection moulding and subsequent insertion of the metal sleeves 21 and of the holding pin. The slider was able to withstand conventional tests, there was no break when using the corresponding design even under heavy load.

TABLE 1

| Composition and properties of the materials B1-B4, used for making the sliders | | | | | |
|---|---|---|---|---|---|
| Component | Unit | B1 | B2 | B3 | B4 |
| PA66 (component A1) | wt.-% | 37.2 | 37.2 | 29.8 | 29.8 |
| PA 6I/6T (component A2) | wt.-% | 12.4 | 12.4 | 9.9 | 9.9 |
| GF Roving 17 μm diameter (component B) | wt.-% | 50 | | 60 | |
| GF Roving 12 μm diameter (component B) | wt.-% | | 50 | | 60 |
| Irganox 1098 (component C) | wt.-% | 0.25 | 0.25 | 0.2 | 0.2 |
| Bruggolen H10 (component C) | wt.-% | 0.15 | 0.15 | 0.1 | 0.1 |
| Properties | | | | | |
| HDT A | ° C. | 255 | 255 | 255 | 255 |
| HDT C | ° C. | 220 | 220 | 225 | 230 |
| ISO tensile modulus of elasticity | MPa | 17500 | 17500 | 22500 | 23500 |
| ISO ultimate tensile strength | MPa | 270 | 290 | 230 | 315 |
| ISO tensile strain at break | % | 2.5 | 2.6 | 2.1 | 2.2 |
| Impact resistance, 23° C. | kJ/m$^2$ | 105 | 115 | 115 | 125 |
| Notched impact resistance, 23° C. | kJ/m$^2$ | 35 | 40 | 40 | 45 |

The polyamide materials used were as follows:

| | |
|---|---|
| PA66 | (A1) Polyamide 66 having a melting temperature of 260° C. measured according to ISO 11357-2:2020 on unconditioned material and a relative viscosity of 1.8 measured in m-cresol at a concentration of 0.5% and a temperature of 20° C. according to ISO 307 (2019). |
| PA 6I/6T | (A2) Polyamide 6I/6T with a proportion of 6I to 6T blocks of 2:1, a glass transition temperature of 125° C. measured according to ISO 11357-2:2020 on unconditioned material and a relative viscosity measured in m-cresol at a concentration of 0.5% and a temperature of 20° C. according to ISO 307 of 1.48. |

The moulding compositions having the compositions B1-B4 in Table 1 were prepared by a pultrusion process in which the polyamide blends A (components A1 and A2) combined with further additives (component C), were mixed and melted in a twin-screw extruder before being transferred to an impregnation unit and brought into contact with the preheated continuous filament glass fibres (GF Roving 17 μm and GF Roving 12 μm, continuous filament glass fibres).

Specifically, the pultrusion process proceeded as follows: Components A1, A2 and C were metered into the feed zone of a twin-screw extruder with a screw diameter of 40 mm. Subsequently, the components were mixed with an increasing temperature profile of 270 to 340° C. The extruder, which was firmly connected to the impregnation unit, conveyed the melt directly into the impregnation unit so that the glass fibres, preheated to 180 to 220° C., were infiltrated. The continuous glass fibres, 1200 tex rovings in the case of 12 μm fibres and 2400 tex rovings in the case of 17 μm fibres, were drawn through the impregnation zone at a speed of 8 to 15 meters per minute, with heating zones ranging from 340 to 400° C. The strands thus impregnated were cut to a length of 10 mm after cooling in water. After pelletization and drying for 24 h at 110° C., the properties of the pellets were measured and the test specimens were produced.

The test samples were produced in an Arburg Allrounder injection-moulding machine, with the cylinder temperatures set at from 250° C. to 350° C. and a peripheral velocity of the screw of 15 m/min. The mould temperature selected was 80 to 130° C. The measurements were made in accordance with the following standards on the following test samples.

Tensile modulus of elasticity was determined in accordance with ISO 527 with tensile velocity 1 mm/min, yield stress, ultimate tensile strength and tensile strain at break were determined in accordance with ISO 527 with tensile testing velocity 50 mm/min (unreinforced variants) or with tensile testing velocity 5 mm/min (reinforced variants) at a temperature of 23° C., using as test sample an ISO tensile specimen, standard: ISO/CD 3167, type A1, 170×20/10×4 mm. Tensile modulus of elasticity, ultimate tensile strength and tensile strain at break were determined perpendicularly to the direction of processing, according out the tests described above Impact resistance and notched impact resistance were measured in accordance with ISO 179 on an ISO test specimen, standard: ISO/CD 3167, type B1, 80×10×4 mm at temperature 23° C.

Heat deflection temperature was determined in the form of HDT A (1.8 MPa) and HDT C (8 MPa) in accordance with ISO 75 (2013) on ISO impact specimens measuring 80×10×4 mm.

LIST OF REFERENCE SIGNS

| | |
|---|---|
| 1 | slider/upper rail |
| 2 | metal/lower rail |
| 3 | base portion of 1 |
| 4 | upper portion of 1 |
| 5 | lateral guide portion |
| 6 | guide protrusion |
| 7 | bottom surface |

-continued

| | |
|---|---|
| 8 | bottom portion |
| 9 | sidewall |
| 10 | horizontal portion |
| 11 | downward facing portion |
| 12 | groove |
| 13 | constriction |
| 14 | widened portion |
| 15 | upper axis |
| 16 | cutout |
| 17 | holding pin |
| 18 | passage opening |
| 19 | locking section |
| 20 | through opening |
| 21 | metal sleeve |
| 22 | locking lever |
| 23 | tooth of 22 |
| 24 | rounded lower surface of 16 |
| 25 | sliding direction |
| 26 | window |
| 27 | rounded bottom of 12 |
| 28 | conical portion |
| 29 | upper surface of 4 |
| 30 | inner surface of 6 |
| a1 | transverse width of 13 |
| a2 | inner height of 12 |
| a3 | inner width of 12 |
| a4 | total width of 12 |
| a5 | width of 6 |
| a6 | total height of 12 |
| a7 | height of 3 |
| b1 | transverse width of 19 |
| d1 | diameter of 24 |
| R | radius |
| w | total transverse width of bottom portion |

The invention claimed is:

1. A slider for a car seat support which can be locked in different positions along a sliding direction, to be mounted in a metal rail, wherein the slider comprises an extended base portion and an extended upper portion, said base portion and said upper portion being connected by a constricted portion, wherein said base portion comprises two lateral guide portions with guide protrusions pointing upward in the direction of said upper portion and forming, with said constricted portion, a groove on each side, and wherein the slider essentially consists of fibre reinforced polyamide.

2. The slider according to claim 1, wherein the base portion, in a middle region along the sliding direction, comprises at least one through-opening to be penetrated by at least one tooth of at least one locking lever.

3. The slider according to claim 2, wherein said through opening comprises a metal sleeve.

4. The slider according to claim 1, wherein said groove has a transverse width in the range of 2-10 mm.

5. The slider according to claim 1, wherein said groove has an at least partially rounded bottom.

6. The slider according to claim 1, wherein said upper portion comprises at least one cutout for a holding pin, wherein the holding pin points essentially along the sliding direction, and wherein below said holding pin there is a passage opening with a rounded lower surface to said lower portion.

7. The slider according to claim 6, wherein the diameter of said rounded lower surface is in the range of 10-40 mm.

8. The slider according to claim 1, wherein the transverse width of the constricted portion is in the range of 10-20 mm, and/or wherein the transverse width of the guide protrusion is in the range of 5-15 mm, and/or wherein the height of the guide protrusion is in the range of 15-30 mm, and/or wherein the height of said groove is in the range of 4-12 mm, and/or a wherein the total transverse width of the bottom portion is in the range of 30-60 mm.

9. The slider according to claim 1, wherein from said constriction in a cross-sectional view the shape widens in an essentially conical portion to the width of the upper portion.

10. The slider according to claim 1, wherein it the slider essentially consists of a fibre reinforced blend (A) of an aliphatic polyamide (A1) and a partially aromatic thermoplastic polyamide (A2).

11. The slider according to claim 1, wherein the fibre reinforcement is an endless or long fibre reinforcement, the number average length of the fibres in the slider being larger than 0.5 mm, and/or wherein the fibre reinforcement is a glass fibre reinforcement which consists of fibres having a diameter in the range of 10-25 μm, and/or wherein the fibre reinforcement is a carbon fibre reinforcement which consists of fibres having a diameter in the range of 3-12 μm, and/or wherein the fibre reinforcement is a glassfibre reinforcement selected from the group consisting of A-glass, C-glass, D-glass, E-glass, ECR-glass, M-glass, S-glass, R-glass or a combination thereof.

12. The slider according to claim 1, wherein the slider has a heat deflection temperature HDT-A of at least 200° C., and/or a heat deflection temperature HDT-C of at least 190° C., in each case for a glassfibre reinforcement of 50% by weight.

13. A method for producing a slider according to claim 1, wherein the slider is produced in an injection moulding process starting out from long fibre reinforced pellets having a length of 3-25 mm.

14. A car with a slider according to claim 1.

15. The slider according to claim 2, wherein above said middle region there is located a window, and/or wherein in said middle region there are no lateral guide portions.

16. The slider according to claim 2, wherein said through opening comprises a metal sleeve, having a wall thickness in the range of 0.5-5 mm, or in the range of 1.0-3 mm, and wherein the metal of said sleeve is selected from the group consisting of iron, and alloys thereof, including steel and stainless steel.

17. The slider according to claim 1, wherein said groove has a transverse width in the range of 4-8 mm.

18. The slider according to claim 1, wherein said groove has an at least partially rounded bottom having a radius (R) in the range of 1-3 mm, and/or wherein the shape of the rounded bottom is rounded in the transition from said constriction with a large radius and forms a sharp edge or a rounded transition with a smaller radius with an inner face of the respective guide protrusion, wherein said smaller radius is in the range of 0.1-1 mm, or in the range of 0.2-0.7 mm.

19. The slider according to claim 6, wherein said upper portion comprises at least one cutout for a metal holding pin made of iron ore and alloys thereof, including steel and stainless steel, wherein the holding pin points essentially along the sliding direction, and wherein below said holding pin there is a passage opening with a rounded lower surface to said lower portion, and/or wherein said rounded lower surface in the bottom portion thereof essentially forms a half-cylindrical surface with a horizontal axis essentially perpendicular to the sliding direction.

20. The slider according to claim 6, wherein the diameter of said rounded lower surface is in the range of 20-30 mm.

21. The slider according to claim 1, wherein the transverse width of the constricted portion is in the range of 12-16 mm, and/or wherein the transverse width of the guide protrusion is in the range of 7.5-12 mm, and/or wherein the height of the guide protrusion is in the range of 20-30 mm, and/or wherein the height of said groove is in the range of 7-11 mm, and/or a wherein the total transverse width of the bottom portion is in the range of 40-50 mm.

22. The slider according to claim 18, wherein the upper surface, in a cross-sectional view, is rounded, with a radius in the range of 10-30 mm, or in the range of 15-25 mm.

23. The slider according to claim 1, wherein the slider essentially consists of a fibre reinforced blend (A) of an aliphatic polyamide (A1) and a partially aromatic thermoplastic polyamide (A2), wherein the polyamide blend (A) consists of:

(A1) 65 to 85 parts by weight of a partially crystalline aliphatic polyamide, with a glass transition temperature>70° C., measured according to ISO 11357-2:2020 on unconditioned material and mixtures thereof;

(A2) 15 to 35 parts by weight of an amorphous partially aromatic polyamide built from (A2_1) 60 to 100 parts by weight, of polyamide units derived from isophthalic acid in combination with hexamethylenediamine (1,6-hexanediamine) in an essentially equimolar ratio, (A2_2) 0 to 40 parts by weight, of polyamide units derived from terephthalic acid in combination with hexamethylenediamine in an essentially equimolar ratio, wherein the parts by weight of components (A2_1) and (A2_2) together give 100 parts by weight, of the total amorphous partially aromatic polyamide (A2), and wherein the parts by weight of components (A1) and (A2) together give 100 parts by weight of the polyamide mixture (A), wherein said polyamide blend (A) is supplemented with 40-70% by weight, or in the range of 45-65% by weight of fibres (B), and can further be supplemented with further additives (C) in a proportion of 0-5% by weight, wherein the total of the material of the slider is given by the sum of (A)-(C).

24. The slider according to claim 1, wherein the slider it essentially consists of a fibre reinforced blend (A) of an aliphatic polyamide (A1) and a partially aromatic thermoplastic polyamide (A2), wherein the polyamide blend (A) consists of:

(A1) 65 to 85 parts by weight of partially crystalline aliphatic polyamide, with a glass transition temperature>70° C., measured according to ISO 11357-2:2020 on unconditioned material, selected from the group consisting of PA6, PA66, PA66/6, PA610 and mixtures thereof;

(A2) 15 to 35 parts by weight of an amorphous partially aromatic polyamide built from (A2_1) 60 to 80 parts by weight, or 60 to 65 parts by weight or 67 parts by weight, of polyamide units derived from isophthalic acid in combination with hexamethylenediamine (1,6-hexanediamine) in an essentially equimolar ratio, (A2_2) 20 to 40 parts by weight, or 30 to 35 parts by weight or 33 parts by weight of polyamide units derived from terephthalic acid in combination with hexamethylenediamine in an essentially equimolar ratio, wherein the parts by weight of components (A2_1) and (A2_2) together give 100 parts by weight, of the total amorphous partially aromatic polyamide (A2), and wherein the parts by weight of components (A1) and (A2) together give 100 parts by weight of the polyamide mixture (A), wherein said polyamide blend (A) is supplemented with 40-70% by weight, or in the range of 45-65% by weight of glass fibres (B) and can further be supplemented with further additives (C) in a proportion of 0.1-2% by weight, wherein the total of the material of the slider is given by the sum of (A)-(C).

25. The slider according to claim 1, wherein the fibre reinforcement is an endless or long fibre reinforcement, the number average length of the fibres in the slider being larger than 0.7 mm, or in the range of 0.5-5 mm, or in the range of 0.7-3 mm and/or wherein the fibre reinforcement is a glass fibre reinforcement which consists of fibres having a diameter in the range of 11-18 μm, and/or wherein the fibre reinforcement is a carbon fibre reinforcement which consists of fibres having a diameter in the range of 4-10 μm.

26. The slider according to claim 1, wherein the slider it has a heat deflection temperature HDT-A of at least 240° C., or in the range of 240-260° C.

and/or a heat deflection temperature HDT-C of at least 200° C., or in the range of 210-230° C., in each case for a glassfibre reinforcement of 50% by weight.

27. The method according to claim 13, wherein the long fibre reinforced pellets have a length of 4-12 mm.

* * * * *